United States Patent [19]
Lahoda et al.

[11] Patent Number: 5,372,650
[45] Date of Patent: Dec. 13, 1994

[54] METHOD FOR TREATMENT OF WASTE SAND

[75] Inventors: Edward J. Lahoda, Edgewood Borough; David C. Grant, Gibsonia; Nicholas D'Amico, Swissvale; Ching-Yu Lin, Monroeville; Arthur L. Wolfe, Murrysville; Ivan A. Martorell, Delmont, all of Pa.

[73] Assignee: Westinghouse Electric Corporation, Pittsburgh, Pa.

[21] Appl. No.: 52,509

[22] Filed: Apr. 27, 1993

[51] Int. Cl.$^5$ ............................................ B08B 3/04
[52] U.S. Cl. .................................. 134/25.1; 134/38; 134/10; 252/DIG. 8
[58] Field of Search ................. 134/25.1, 38, 10; 252/DIG. 8, 626

[56] References Cited

U.S. PATENT DOCUMENTS

| | | | |
|---|---|---|---|
| 4,606,774 | 8/1986 | Morris | 134/10 |
| 4,646,978 | 3/1987 | Johnson et al. | 241/24 |
| 4,762,280 | 8/1988 | Prisco et al. | 241/3 |
| 4,783,263 | 11/1988 | Trost et al. | 134/25.1 |
| 4,841,998 | 6/1989 | Bruya | 134/10 |
| 4,955,403 | 9/1990 | Zappa et al. | 134/109 |
| 5,019,175 | 5/1991 | Rogers et al. | 134/42 |
| 5,056,541 | 10/1991 | Schade et al. | 134/25.1 |
| 5,128,068 | 7/1992 | Lahoda et al. | 252/626 |
| 5,133,901 | 7/1992 | Peterson et al. | 252/626 |

Primary Examiner—Richard O. Dean
Assistant Examiner—Zeinab El-Arini
Attorney, Agent, or Firm—Daniel P. Cillo

[57] ABSTRACT

A process system is disclosed for the treatment of a waste sand material containing metal contaminants. The waste sand material is the product of sandblasting techniques used to remove paint. The metal contaminants generally include lead, copper, chromium, mercury and cadmium, among other heavy metals. The process particularly provides for the concentration of the lead contaminant in a waste sand that can be economically reclaimed or disposed in an environmentally safe manner. The process also produces a cleaned sand that contains only residual amounts of the metallic contaminants in environmentally acceptable levels. The process provides for the contacting of the waste sand material with a paint decomposer, attrition abrading this sand slurry, size separating the attrition abraded slurry to form a waste sand slurry and a cleaned sand, and removing a portion of the excess water content in the waste sand slurry.

20 Claims, 1 Drawing Sheet

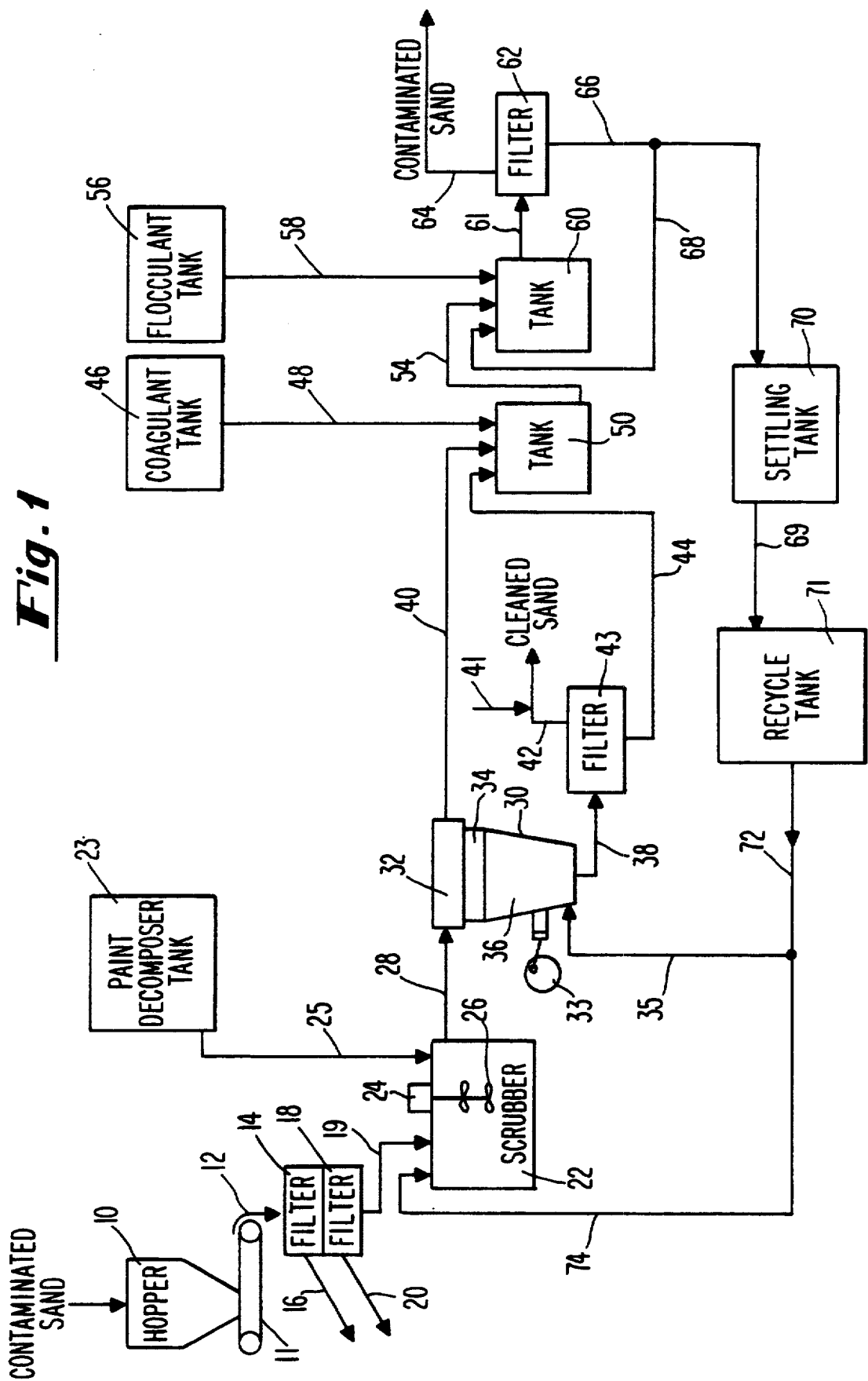

METHOD FOR TREATMENT OF WASTE SAND

FIELD OF THE INVENTION

The present invention relates to processes for the treatment of waste sand containing metal contaminants. More particularly, the processes relate to the concentration of lead and other metal elements in waste sandblasting sand and the production of a cleaned sand containing acceptable levels of these contaminants.

BACKGROUND OF THE INVENTION

The maintenance of aging steel structures, such as bridges and overpasses, poses a serious problem for governmental officials. These structures usually have layers of paint to prevent corrosion which, in certain cases, must be removed before reconditioning with new paint. The problem is that the old paint, especially the primer undercoat paint layer, may contain lead. The removal of this lead-based paint is typically accomplished by a sandblasting technique. However, the waste created by this process is a large volume of waste sand contaminated with metals, such as lead. The contaminated sand must be disposed of as a toxic material under environmental regulations, and this disposal is therefore expensive. For example, the reconditioning of a typical highway bridge can generate up to 800 tons of waste sand which could cost up to about $400,000 to dispose in a landfill.

There exist various methods for the treatment of contaminated waste soils, such as those process systems shown in U.S. Pat. Nos. 5,128,068; 5,056,541; 4,841,998; and 4,783,263. These processes typically rely upon size and density separatory techniques to purify the waste soil. The use of these techniques does not enable production of a cleaned sandblasting sand to environmentally acceptable levels, because the paint chips are not easily separated from the sand on the basis of size or density.

A need therefore exists to provide a process for the treatment of waste sandblasting sand that contains paint chip particles with metal contaminants. Further, the process must be economically competitive with other waste disposal means and it must be practical in design so that it can be practiced on location at decontamination sites.

SUMMARY OF THE INVENTION

The present invention provides for processes for treating waste sandblasting material that is contaminated with metals, such as lead. The processes provide for the concentration of the metal contaminants in a waste sand stream and for the production of cleaned sand containing acceptable levels of residual contaminant metals.

The processes of the present invention are performed by contacting a waste sandblasting material with a paint decomposer to form a sand slurry. The waste sandblasting material generally contains sand particles of varying size, paint particles, and metal contaminants. The paint decomposer allows for the separation of cleaned sand particles from the sand slurry thereby leaving a waste sand slurry.

One embodiment of the process is performed by providing a sandblasting sand containing sand particles of varying particle size, paint particles, and metal contaminants. This sand mixture is contacted with a paint decomposer to form a sand slurry. The paint decomposer is preferably a caustic solution, more preferably a 1-10% by weight sodium hydroxide solution. The paint decomposer acts to decompose the paint particles so that they will break apart upon further processing. The sand slurry is then attrition abraded, preferably in an attrition scrubber, to break apart the paint particles and to dislodge the paint particles from the sand particles, forming an attrition sand slurry. The attrition sand slurry is then size separated to remove cleaned sand particles by means of a countercurrent rinsing operation. The attrition sand slurry is fed into a separation vessel in a first flow direction and an aqueous cleaning solution is fed into the separation vessel in a second flow direction counter to the first flow. A waste sand slurry containing metal contaminants and fine sand particles is formed within the separation vessel and is carried out of the vessel by the cleaning solution. A cleaned sand slurry, passing countercurrent to the second flow direction, is formed containing sand particles having a larger average particle size than the fine sand particles. The metal contaminant in the waste slurry removed from the separation vessel is concentrated by removing aqueous solution from the waste sand slurry.

The separation vessel is preferably a mineral jig operated in a countercurrent fashion. The attrition sand slurry is introduced into the jig and the cleaning solution is introduced at a point vertically below the attrition sand slurry introduction. The cleaned sand passes countercurrently to the cleaning solution and is removed at a point vertically below the waste sand removal point. In another embodiment, the attrition sand slurry is passed into a hindered settling bed which is preferably contained within the mineral jig.

The concentration of the metal contaminants in the waste sand slurry exiting the separation vessel is preferably conducted by admixing a coagulation agent for the metal contaminant and a flocculation agent into the waste sand slurry to form a flocculated material in a flocculation solution. The flocculated material is then separated from this solution, preferably by filtration. The preferred coagulation agent is a ferric or aluminum sulfate solution.

The process is preferably operated to provide for reclamation of from about 75-95% by weight cleaned sand from the contaminated sand feed. The process is also preferably operated in a recycle mode for the aqueous solution used as the carrier solution in the sand slurries, such as recycling the flocculation solution to be used as the cleaning solution in the separation vessel.

BRIEF DESCRIPTION OF THE DRAWING

FIG. 1 is a process flow sheet depicting one embodiment of the invention.

DETAILED DESCRIPTION OF THE INVENTION

The present invention provides processes for treating sand used for removing paint from structures by means of sandblasting. The sandblasting process produces a waste sand material that contains, among other substances, sand particles of varying particle sizes, and paint chips. The paint chips can be physically separate from the sand or they can be physically attached to the sand. The paint chips generally contain at least two layers of paint, a first primer undercoat layer and a second top layer. The primer undercoat protects the painted surface from corrosion and contains the metallic contaminants. The top layer is generally a color coating, and protects the primer layer from the natural elements such as rain, sun, etc. These paint chips generally contain metal contaminants, such as lead, chromium, cadmium, and copper, along with other heavy metals such as mercury. The major contaminant to be removed is the lead, and the lead is generally present in the sandblasting sand in an amount of up to about 5 weight percent, and more typically from about 0.5 to about 3 weight percent. The present process separates cleaned sand from the sandblasting sand and concentrates the metal contaminates into a waste stream.

An embodiment of the process is illustrated in FIG. 1. The contaminated sand is preferably separated from any large paint chips or particulate impurities by means of mechanical screening. As shown in FIG. 1, the contaminated sandblasting sand is stored in a hopper 10 and the sand feed material 12 is transported to a filter 14 by a conveyor belt 11. The filter 14, preferably a metal screen, removes any large particulate impurities above about 0.25 inch via line 16. The sandblasting sand passing through the filter 14 is preferably passed through a second filter 18 to remove larger paint chips. The filter 18 is preferably sized to remove particles above about 5 mm, more preferably above about 2 mm in size from the process via line 20, and the filter 18 can be a metal screen.

The sandblasting sand material passing through the filter 18 is carried along line 19 to an attrition scrubber 22. A paint decomposer is contacted with the sandblasting sand material at this stage of the process to form an attrition scrubber slurry. The paint decomposer can be admixed with the sand material either prior to or during the addition of the sand to the attrition scrubber 22. As shown in FIG. 1, the paint decomposer is stored in tank 23 and transferred to the attrition scrubber 22 via line 25.

The paint decomposer is any chemical compound or composition which aids in the decomposition of the paint material, particularly the paint top coat or color coating, such as a caustic solution preferably having a pH of at least about 10. The caustic solution can be about a 1-50% wt., preferably 1-25% wt., more preferably about a 1-10% wt., and most preferably about a 2-5% wt., sodium hydroxide solution. The paint decomposer is admixed with the sandblasting sand in an amount to wet the sand. The paint decomposer solution admixed with the sand should be sufficient to produce a 40-90% wt., preferably a 50-85% wt., and more preferably a 60-80% wt., solids slurry.

The attrition scrubber 22 has a motor 24 that drives blades 26 which cause intermixing of the attrition scrubber slurry and breaks apart the paint chips and dislodges paint chips from sand particles. The residence time for the attrition sand slurry in the attrition scrubber 22, that is, the average time for which the paint decomposer is contacted with the sandblasting sand in an agitated vessel, is preferably at least about 45 seconds, more preferably at least about 60 seconds. Shorter residence times can be used depending upon the type of sandblasting sand, however sufficient time should be allowed for the partial decomposition of the paint chip material.

The attrition scrubber slurry is then treated, to remove cleaned sand particles substantially free of metal contaminants. The preferred process for this step is a size separation operation carried out in a separation tank under countercurrent flow conditions. The attrition sand slurry is introduced into a separation vessel 30 in a first flow direction via line 28. An aqueous cleaning solution is introduced into the separation vessel 30 via line 35 in a second flow direction counter to the first flow. A waste sand slurry is formed, comprising metal contaminates and fine sand particles, which is carried by the cleaning solution to exit the separation vessel 30 via line 40. A cleaned sand slurry, passing countercurrent to the second flow direction, is formed comprising sand particles having a larger average particle size than the fine sand particles in the waste sand slurry. The waste slurry contains sand having a smaller average particle size than the cleaned sand, and their respective average particle sizes will depend upon the type of sand to be processed. Preferably the cleaned sand will be comprised of sand particles greater than about 60 microns, more preferably greater than about 100 microns.

The separation vessel 30 is preferably a mineral jig operated in countercurrent fashion. The attrition scrubber slurry is introduced via line 28 at a point vertically above the introduction of the cleaning solution via line 35. The cleaning solution is referred to as the "upflow" solution in that the cleaning solution has an internal upward fluid flow within the mineral jig. This upward flow of the cleaning solution has a superimposed pulse created by the diaphragm 33. The large, heavier sand particles will flow downward with gravity against the upflowing cleaning solution and can be collected in the bottom of the mineral jig. The smaller sand particles and the substantial portion of the metal contaminates are carried upward with the cleaning solution and form a waste slurry that is transported from the jig via line 40.

The jig can be operated with a hindered settling bed 34 to aid in the separation of the cleaned sand particles and the waste slurry. The bed 34 separates the jig into an upper jig section 32 and a lower jig section 36. The bed 34 can be comprised of a plurality of balls, preferably a layer or multiple layers of such balls. The balls typically have a diameter of about 3/16 inch (about 0.5 cm) or greater. The attrition scrubber slurry passes into the hindered settling bed 34 with the larger cleaned sand particles passing through the bed. The smaller sand particles, and a substantial portion of the metal contaminants, are retained within the hindered bed 34 and are then removed from the mineral jig by the upward flow of the cleaning solution.

The operation of the separation vessel is controlled such that the cleaned sand meets the prescribed emission standards. The level of metal contaminant impurities in the cleaned sand is directly proportional to the processing variables in the separation vessel. For example, in the operation of the mineral jig, the contaminant level in the cleaned sand decreases with increasing cleaning solution flow rate which corresponds to a lower percentage of sand in the cleaned sand stream. The sandblasting sand is primarily treated for lead removal, however other metal contaminants such as copper, cadmium, and chromium can also be removed. The lead level in the waste sandblasting material can be about 0.25 to about 3 weight percent depending upon the paint removed, the structure from which the paint was removed, and the type of sandblasting operation, however the level of lead in the waste sandblasting sand generally exceeds at least about 2500 ppm. The level of the metal contaminants, lead, copper, cadmium, and chromium, each individually, in the cleaned sand is below about 1000 ppm, preferably below about 500 ppm. The toxic chemical leaching procedure, TCLP, levels are below about 5 ppm lead, about 1 ppm cadmium, and about 5 ppm chromium.

The mineral jig is generally operated at a sand recovery rate of from about 75 to about 95 weight percent, more preferably from about 75 to about 85 weight percent. The sand recovery rate is defined as the weight of cleaned sand removed from the jig to the weight of sand flowing into the jig. The mineral jig can be operated with an upflow rate of from about 4 to about 10 gpm/ft$^2$ (about 163 to 407 liters per minute/m$^2$), preferably from about 4 to about 8 gpm/ft$^2$ (about 326 lpm/m$^2$), more preferably from about 4.5 to about 7.5 gpm/ft$^2$ (about 183 to 305 lpm/m$^2$). The jig can be operated with a stroke length of about ½ to about ¾ inch (about 1.27 to 1.9 cm) and a pulse frequency of about 300–400 per minute. In a preferred embodiment, the mass balance on the jig is such that about 1.5–2 parts cleaning solution is added for every 1 part sand in the attrition sand slurry.

The cleaning solution used in the separation vessel 30 is an aqueous solution. Preferably the cleaning solution is a caustic solution having a pH of at least about 10. The caustic solution can be a 1–25% wt., more preferably a 1–10% wt., sodium hydroxide solution. The cleaning solution not only aids in the separation of the cleaned sand from the waste slurry, but also cleanses the cleaned sand particles.

The cleaned sand removed from the separation vessel 30 can be further processed by removing excess fluid and neutralizing the sand. As shown in FIG. 1, the cleaned sand is transported via line 38 to a filter system 43. The filter system 43 can be a single or a series of mechanical filter screens. Preferably, two filter screens are used in series, the first filter being a 100 mesh filter and the second a 200 mesh filter. The cleaned sand exiting the separator is typically at about 25% wt. solids, and the solids content is increased to about 60–90% wt. following the filter operation. The cleaned sand taken off the filters via line 42 can be neutralized by contacting it with an acid, such as a mineral acid like phosphoric, sulfuric, hydrochloric, or nitric acid via line 41, preferably phosphoric acid, which precipitates and binds to any lead to form lead phosphate which will not leach when exposed to an acidic solution.

The waste slurry from the separation vessel 30 is further treated to concentrate the metal contaminants. The waste slurry at this point in the process can generally contain about 1 part lead to about 10 parts sand. The waste slurry, as shown in FIG. 1, is transferred via line 40 to a tank 50. The solution passing through the filter 43 can also be transferred to tank 50, as shown by line 44. The metal contaminants, particularly lead, at this point in the process are either in particulate or dissolved form in the waste sand slurry.

A coagulant, or coagulation agent, is added to the tank 50 to bind to the particulate contaminant and to precipitate the soluble contaminant. In the case of the lead contaminant, the coagulant should include an oxidizable cation or anion to reduce the dissolved lead to particulate lead metal. Coagulants for lead, among others, include ferric sulfate, aluminum sulfate, and ferrous chloride, preferably the ferrous and aluminum sulfates, more preferably ferrous sulfate. The ferrous sulfate can be added as an aqueous solution, preferably about 20–25% wt. ferrous sulfate, and generally in a ratio of about 1 part ferrous sulfate to about 10 parts sand. The hydroxides of the iron and aluminum, formed in the caustic solution, act to bind the particulate contaminant metal. As shown in FIG. 1, the coagulant is stored in tank 46 and transferred to tank 50 via line 48.

The coagulation can also be accomplished by outfitting tank 50 with electrolytic means. For instance, an iron or aluminum cathode could be operated in the caustic solution present in tank 50 to provide the desired precipitation of the contaminant metal.

The waste sand slurry with the coagulated metal contaminant is then transferred via line 54 to tank 60 for treatment with a flocculation agent to concentrate the coagulated metal contaminant material. The flocculant is stored in tank 56 and transferred to tank 60 via line 58. The flocculant is preferably an organic agent and can be anionic, nonionic, or cationic in nature, however nonionic flocculants are preferred. The flocculant is added as an aqueous solution, preferably about a 0.025–2% wt. solution, and is generally added in an amount of about 1 part flocculant to about 3000 parts sand.

The flocculated sand containing the concentrated metal contaminants can be further processed to increase the solids content by removing water, thereby increasing its recycling value and lowering disposal costs. The sand solution from tank 60 is transferred via line 61 to filter 62. Filter 62 is preferably a rotary screen filter. The flocculated sand entering the filter 62 typically has a sand content of about 5–10% wt. and the contaminated sand exiting the filter 62 via line 64 typically has a sand content of at least about 40% wt. The filtrate from the filter 62 can be recycled by its transfer via line 66 to a settling tank 70. This tank allows for the settling out of any sand carried over from the filtering operation. A portion of the filtrate can be redirected to the filter 62 via line 68 to aid the filtration process. The solution from tank 70 can be transferred to a recycle tank 71 via line 69, and the solution from tank 71 can be transferred via line 72 and used in the attrition scrubber 22 via line 74 and also as the cleaning solution in the separation vessel 30 via line 35.

The process of the present invention thereby allows for the concentration of heavy metal contaminants, and particularly lead, found in waste sandblasting sand. The process allows for the recovery of up to about 75–95% by weight of the original sand as cleaned sand meeting strict environmental safety standards. The remainder of the sand contains the metal contaminants in concentrated form suitable for disposal or reclamation of the metal material. The process can be performed in any type of industrial setting, thus the process can be designed to handle small quantities of waste sandblasting material where the process would be of a mobile design up to larger, industrial scale quantities of waste sandblasting material where the process would be a fixed structure.

We claim:

1. A process for treating sand which contains metal contaminants, to concentrate the metal contaminants, comprising:
   (a) providing a waste sandblasting material, from a sandblasting paint removal operation, comprising sand particles of varying particle size, paint particles, and metal contaminants;
   (b) contacting the waste sandblasting material with a caustic paint decomposer solution in an amount effective to aid in the decomposition of the paint particles, and to form a sand slurry;
   (c) allowing for at least partial decomposition of the paint particles in the sand slurry by the caustic paint decomposer;

(d) abrading the sand slurry, to break up the paint particles and to dislodge the paint particles from the sand particles, leaving an abraded sand slurry which contains metal contaminants; and (e) separating cleaned sand particles from the abraded sand slurry thereby leaving a waste sand slurry which contains metal contaminants.

2. The process of claim 1 further comprising size separating cleaned sand particles from the abraded sand slurry by countercurrent rinsing comprising introducing the abraded sand slurry into a separation vessel in a first flow direction and introducing an aqueous caustic cleaning solution into the separation vessel in a second flow direction counter to the first flow, whereby a waste sand slurry is formed comprising metal contaminates and fine sand particles, which waste sand slurry is carried by the cleaning solution, and a cleaned sand slurry, passing countercurrent to the second flow direction, is formed comprising sand particles having a larger average particle size than the fine sand particles.

3. The method of claim 2 further comprising concentrating said metal contaminants in the waste sand slurry by removing cleaning solution from the waste sand slurry, where the cleaning solution has a pH of at least about 10.

4. The process of claim 3 wherein the concentrating step further comprises:
   (i) admixing a coagulation agent for the metal contaminant and a flocculation agent into the waste sand slurry to form a flocculated material and a flocculation solution; and
   (ii) separating the flocculated material from the flocculation solution.

5. The process of claim 4 wherein the size separation step is conducted as a countercurrent mineral jig step and wherein the separation vessel is a mineral jig, further comprising introducing the abraded sand slurry into the mineral jig and introducing the cleaning solution at a point vertically below the abraded sand slurry introduction and removing the cleaned sand passing countercurrently to the cleaning solution at a point vertically below the waste sand removal point.

6. The process of claim 4, where the coagulation agent comprises a coagulation agent selected from the group consisting of ferrous sulfate and aluminum sulfate.

7. The process of claim 1 wherein the paint decomposer comprises a caustic solution having a pH of at least about 10.

8. The process of claim 1 wherein the caustic paint decomposer solution is a 1–10 percent by weight sodium hydroxide solution.

9. The process of claim 1 wherein the metal contaminates comprise lead and the cleaned sand has a lead content below about 1000 ppm.

10. The process of claim 9 wherein the cleaned sand contains less than about 500 ppm lead.

11. A process for treating sandblasting sand which contains lead contaminants, to concentrate the lead contaminants, comprising:
   (a) providing a sandblasting sand comprising sand particles of varying particle size, paint particles, and lead contaminants;
   (b) contacting the sandblasting sand with a caustic paint decomposer solution in an amount effective to aid in the decomposition of the paint, and to form a sand slurry;
   (c) allowing for at least partial decomposition of the paint particles in the sand slurry by the caustic paint decomposer;
   (d) attrition abrading the sand slurry to break up the paint particles and to dislodge the paint particles from the sand particles, forming an abraded sand slurry;
   (e) size separating cleaned sand particles from the abraded sand slurry by countercurrent rinsing comprising introducing the abraded sand slurry into a separation vessel in a first flow direction and introducing an aqueous cleaning solution into the separation vessel in a second flow direction counter to the first flow, whereby a waste sand slurry is formed comprising the lead contaminate and fine sand particles which waste sand slurry is carried by the cleaning solution, and a cleaned sand slurry, passing countercurrent to the second flow direction, is formed comprising sand particles having a larger average particle size than the fine sand particles; and
   (f) concentrating the lead contaminant in the waste sand slurry by removing said aqueous cleaning solution from the waste sand slurry.

12. The process of claim 11 wherein the concentrating step further comprises:
   (i) admixing a coagulation agent for the lead contaminant and a flocculation agent into the waste sand slurry to form a flocculated lead material and a flocculation solution; and
   (ii) separating the flocculated lead material from the flocculation solution.

13. The process of claim 12 wherein the coagulation agent comprises a coagulation agent selected from the group consisting of ferrous sulfate and aluminum sulfate, and the aqueous cleaning solution has a pH of at least about 10.

14. The process of claim 12 wherein the metal the cleaned sand has a lead content below about 1000 ppm.

15. The process of claim 14 wherein the cleaned sand contains less than about 500 ppm lead.

16. The process of claim 14 further comprising providing a process storage tank and recycling the flocculation solution to the storage tank to form a process solution.

17. The process of claim 12 wherein the size separation step is conducted as a countercurrent mineral jig step, wherein the separation vessel is a mineral jig, further comprising introducing the abraded sand slurry into the mineral jig and introducing the cleaning solution at a point vertically below the abraded sand slurry introduction and removing the cleaned sand passing countercurrently to the cleaning solution at a point vertically below the waste sand removal point.

18. The process of claim 11 wherein the caustic solution is a 1–10 percent by weight sodium hydroxide solution.

19. A process for treating a sand mixture which contains lead contaminants, to concentrate the lead contaminants, comprising:
   (a) providing sand mixture comprising sand particles of varying particle size, paint particles, and lead contaminants;
   (b) contacting the sand mixture with a caustic paint decomposer solution comprising from about 1 to about 10 weight percent sodium hydroxide in an amount effective to aid in the decomposition of the paint, and to form a sand slurry;

(c) allowing for at least partial decomposition of the paint particles in the sand slurry by the sodium hydroxide paint decomposer;

(d) attrition abrading the sand slurry to break up the paint particles and to dislodge the paint particles from the sand particles, forming an abraded sand slurry;

(e) size separating cleaned sand particles from the abraded sand slurry by countercurrent rinsing comprising introducing the abraded sand slurry into a mineral jig in a first flow direction and introducing an aqueous cleaning solution comprising sodium hydroxide into the mineral jig in a second flow direction counter to the first flow, whereby a waste sand slurry is formed, comprising the lead contaminate and fine sand particles having an average particle size below about 60 microns, which waste sand slurry is carried by the cleaning solution, and a cleaned sand slurry, passing countercurrent to the second flow direction, is formed comprising sand particles having a larger average particle size than the fine sand particles;

(f) admixing a coagulation agent for the lead contaminant and a flocculation agent into the waste sang slurry to form a flocculated lead material and a flocculation solution; and (g) separating the flocculated lead material from the flocculation solution.

20. The process of claim 19, where the coagulation agent comprises a coagulation agent selected from the group consisting of ferrous sulfate and aluminum sulfate.

* * * * *